UNITED STATES PATENT OFFICE 2,250,630

INDIGOID VAT DYESTUFFS

Jaroslav Froehlich, Basel, Ernst Stoecklin, Binningen, and Richard Tobler, Riehen, Switzerland, assignors to the firm of Society of Chemical Industry in Basle, Basel, Switzerland No Drawing. Application October 20, 1938, Serial No. 236,118. In Switzerland October 22, 1937

2 Claims. (Cl. 260—332)

This invention relates to indigoid vat dyestuffs and their manufacture by condensing naphththioindoxyls of the general formula

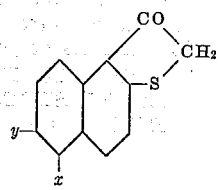

wherein $x$ stands for halogen and $y$ stands for an alkoxy group of the lower aliphatic series, or the reactive 2-derivatives thereof, with naphththioindoxyls or the reactive 2-derivatives thereof. If desired, the dyestuffs thus obtained may be treated with halogenating agents. The dyestuffs thus obtained correspond to the general formula

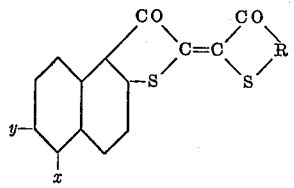

wherein $x$ and $y$ have the signification indicated above and R stands for a naphthalene radical.

Naphththioindoxyls of the above general formula or reactive 2-derivatives thereof are, for example, 5-chloro-6-methoxy-2:1-naphththioindoxyl, 5-chloro-6-ethoxy-2:1-naphththioindoxyl, 5-bromo-6-methoxy-2:1-naphththioindoxyl, 5-bromo-6-ethoxy-2:1-naphththioindoxyl, and the anils of these naphththioindoxyls, for instance the α-(para-dimethylamino)-anil of 5-chloro-6-methoxy-2:1-naphththioindoxyl.

For making the above named indigoid dyestuffs these components are condensed in known manner with naphththioindoxyls, for instance 2:1- and 1:2-naphththioindoxyl and substitution products thereof, as well as for example the 2-anils, particularly the 2-(para-dimethylamino)-anils of these naphththioindoxyls. These naphththioindoxyls may contain as substituents for example halogen atoms, methyl or methoxy groups which may be linked to different places of the naphthalene nucleus.

The naphththioindoxyls of the above general formula may be condensed with the further named components in presence of a solvent, for instance alcohol, benzene, chlorobenzene or tetrachlorethane. The action of a halogenating agent may be conducted with advantage in sulfuric acid solution or in the presence of nitrobenzene or chlorobenzene.

The new dyestuffs are especially suitable for dyeing and printing fibers containing cellulose, for example cotton and other vegetable fibers, as well as artificial silk; they dye various brownish tints. They may be converted by known methods to leuco-ester salts and used in this form for dyeing.

These dyestuffs are characterized by particularly valuable brown to brown-olive tints as could hitherto not be obtained with dyestuffs from unsubstituted naphththioindoxyls or from naphththioindoxyls substituted in another manner, or with any other indigoid dyestuffs.

The aforesaid naphththioindoxyls or their reactive α-derivatives may be made by various methods. For example for making 5-chloro-6-methoxy-2:1-naphththioindoxyl the procedure may be as follows:

From 5-amino-6-methoxynaphthalene-2-sulfonic acid the 5-chloro-6-methoxy-2-naphthalene sulfonic acid may be made in the form of its sodium salt by diazotizing and causing the diazo-compound to react with cuprous chloride by the Sandmeyer method. The sulfonic acid may be converted by treatment with phosphorus pentachloride or phosphorus hydroxychloride into the 5-chloro-6-methoxy-2-naphthalene sulfochloride which crystallizes from benzene in colorless crystals of melting point 142° C. The sulfochloride thus obtained is converted in the usual manner by reduction and subsequent condensation with monochloracetic acid into the 5-chloro-6-methoxy-2-naphthalenethioglycollic acid of melting point 157-158° C. By the reaction of this thioglycollic acid with phosphorus trichloride and aluminium chloride there is produced the 5-chloro-6-methoxy-2:1-naphththioindoxyl which crystallizes from ortho-dichlorobenzene in the form of needles which melt at 265-266° C.

From the naphththioindoxyls of the above general formula the reactive α-derivatives, for instance the α-anils, may be made in known manner by the action of nitroso-compounds.

The following examples illustrate the invention, the parts being by weight:

Example 1

264.5 parts of 5-chloro-6-methoxy-2:1-naphththioindoxyl, 332 parts of 2-(para-dimethylamino)-anil of 2:1-naphththioindoxyl and 6000 parts of benzene are mixed together and the mixture is heated to boiling until the condensation is complete. The whole is then filtered and the solid matter dried. This dyestuff corresponds to the formula

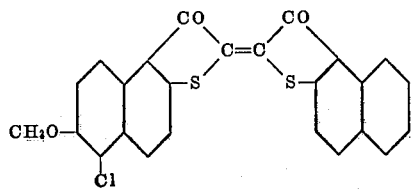

and is a brown powder soluble in concentrated sulfuric acid to a blue solution and dyeing cotton in a red orange vat full olive brown tints of very good fastness.

If for the 2-(para-dimethylamino)-anil of 2:1-naphththioindoxyl there is substituted the same quantity of the 2-(para-dimethylamino)-anil of 1:2-naphththioindoxyl there is obtained a similar dyestuff.

*Example 2*

If in Example 1 for the 264.5 parts of 5-chloro-6-methoxy-2:1-naphththioindoxyl there are substituted 279 parts of 5-chloro-6-ethoxy-2:1-naphththioindoxyl or 310 parts of 5-bromo-6-methoxy-2:1-naphththioindoxyl, there are obtained dyestuffs having very similar properties.

What we claim is:

1. Indigoid vat-dyestuffs of the general formula

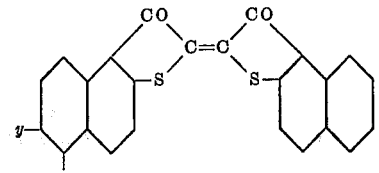

wherein $x$ stands for a halogen selected from the group consisting of chlorine and bromine and $y$ stands for an alkoxy-group of the lower aliphatic series.

2. The indigoid vat-dyestuff of the formula

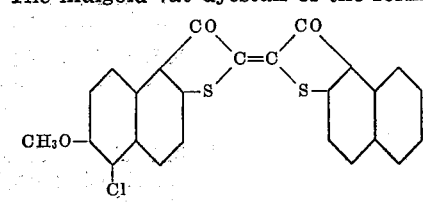

which dissolves in concentrated sulfuric acid to a blue solution and dyes cotton from a red-orange vat olive-brown tints of good fastness.

JAROSLAV FROEHLICH.
ERNST STOECKLIN.
RICHARD TOBLER.